(12) United States Patent
Prause et al.

(10) Patent No.: US 11,014,315 B2
(45) Date of Patent: *May 25, 2021

(54) COMPACTED STRINGER PACKAGES

(71) Applicant: The Boeing Company, Chicago, IL (US)

(72) Inventors: Richard Alexander Prause, Charleston, SC (US); Richard Heath, Mt. Pleasant, SC (US); Andrew Elmer Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 447 days.

This patent is subject to a terminal disclaimer.

(21) Appl. No.: 15/586,153

(22) Filed: May 3, 2017

(65) Prior Publication Data

US 2018/0319050 A1 Nov. 8, 2018

(51) Int. Cl.
| | | |
|---|---|---|
| *B29C 70/44* | (2006.01) | |
| *B29C 43/36* | (2006.01) | |
| *B29C 70/54* | (2006.01) | |
| *B29C 70/46* | (2006.01) | |
| *B29C 70/30* | (2006.01) | |
| *B29L 31/30* | (2006.01) | |
| *B29K 105/08* | (2006.01) | |

(52) U.S. Cl.
CPC ............ *B29C 70/44* (2013.01); *B29C 43/361* (2013.01); *B29C 43/3642* (2013.01); *B29C 70/30* (2013.01); *B29C 70/462* (2013.01); *B29C 70/541* (2013.01); *B29C 2043/3613* (2013.01); *B29C 2043/3644* (2013.01); *B29K 2105/08* (2013.01); *B29K 2105/0872* (2013.01); *B29L 2031/3076* (2013.01)

(58) Field of Classification Search
CPC ................ B29C 70/342; B29C 70/345; B29C 2043/3615; B29C 70/541; B29C 70/56
See application file for complete search history.

(56) References Cited

U.S. PATENT DOCUMENTS

| | | | | |
|---|---|---|---|---|
| 4,126,659 A | 11/1978 | Blad | | |
| 4,648,934 A * | 3/1987 | Kiss | .......................... | B27N 5/02 156/214 |

(Continued)

FOREIGN PATENT DOCUMENTS

| | | |
|---|---|---|
| CA | 2923891 A1 | 3/2015 |
| EP | 2280818 B1 | 10/2014 |

(Continued)

OTHER PUBLICATIONS

European Patent Office Search Report, dated Jan. 23, 2019, regarding Application No. 18170338.0, 13 pages.

(Continued)

*Primary Examiner* — Matthew J Daniels
(74) *Attorney, Agent, or Firm* — Yee & Associates P.C.

(57) ABSTRACT

An illustrative embodiment of the present disclosure provides a method. A composite charge is placed over a forming and cure mandrel, a first radius filler, and a second radius filler. Mechanical pressure is applied to shape the composite charge to the forming and cure mandrel and a rigid base to form a stringer layup having a hat-shaped cross-section. Vacuum pressure is applied to the stringer layup to form a compacted stringer package.

20 Claims, 11 Drawing Sheets

(56) References Cited

U.S. PATENT DOCUMENTS

| | | | |
|---|---|---|---|
| 4,681,724 | A | 7/1987 | Faiz et al. |
| 6,458,309 | B1 | 10/2002 | Allen et al. |
| 7,204,951 | B2 | 4/2007 | Simpson et al. |
| 8,734,711 | B2 * | 5/2014 | Lengsfeld ............ B29C 43/3642 |
| | | | 264/571 |
| 9,221,235 | B1 | 12/2015 | Rotter et al. |
| 9,782,937 | B1 * | 10/2017 | Modin ................... B29C 70/388 |
| 2005/0102814 | A1 * | 5/2005 | Anderson ................ B29C 33/68 |
| | | | 29/455.1 |
| 2010/0139857 | A1 | 6/2010 | Pham et al. |
| 2010/0239865 | A1 | 9/2010 | Kallinen |
| 2014/0099477 | A1 * | 4/2014 | Matsen ................... B29C 70/34 |
| | | | 428/166 |
| 2016/0121560 | A1 * | 5/2016 | Lee ........................ B29C 70/443 |
| | | | 264/511 |
| 2016/0332395 | A1 | 11/2016 | Abe et al. |
| 2016/0354982 | A1 | 12/2016 | Prause et al. |
| 2017/0043510 | A1 | 2/2017 | Heath et al. |
| 2017/0043540 | A1 | 2/2017 | Heath et al. |
| 2017/0210038 | A1 | 7/2017 | Heath et al. |

FOREIGN PATENT DOCUMENTS

| | | |
|---|---|---|
| EP | 2440395 B1 | 11/2014 |
| EP | 3015258 A1 | 5/2016 |
| EP | 3075523 A1 | 10/2016 |
| WO | WO2010089464 A1 | 8/2010 |
| WO | WO2015115437 A1 | 8/2015 |

OTHER PUBLICATIONS

European Patent Office Partial Search Report, dated Sep. 18, 2018, regarding Application No. EP18170338.0, 17 pages.

"Divinycell P," Technical Data Sheet, Diab Group, Feb. 2016, 2 pages.

Heath et al., "Foam Mandrel Assembly," U.S. Appl. No. 15/649,162, filed Jul. 13, 2017, 68 pages.

Office Action, dated Apr. 16, 2019, regarding U.S. Appl. No. 15/649,162, 23 pages.

Notice of Allowance, dated Oct. 15, 2020, regarding U.S. Appl. No. 15/649,162, 9 pages.

* cited by examiner

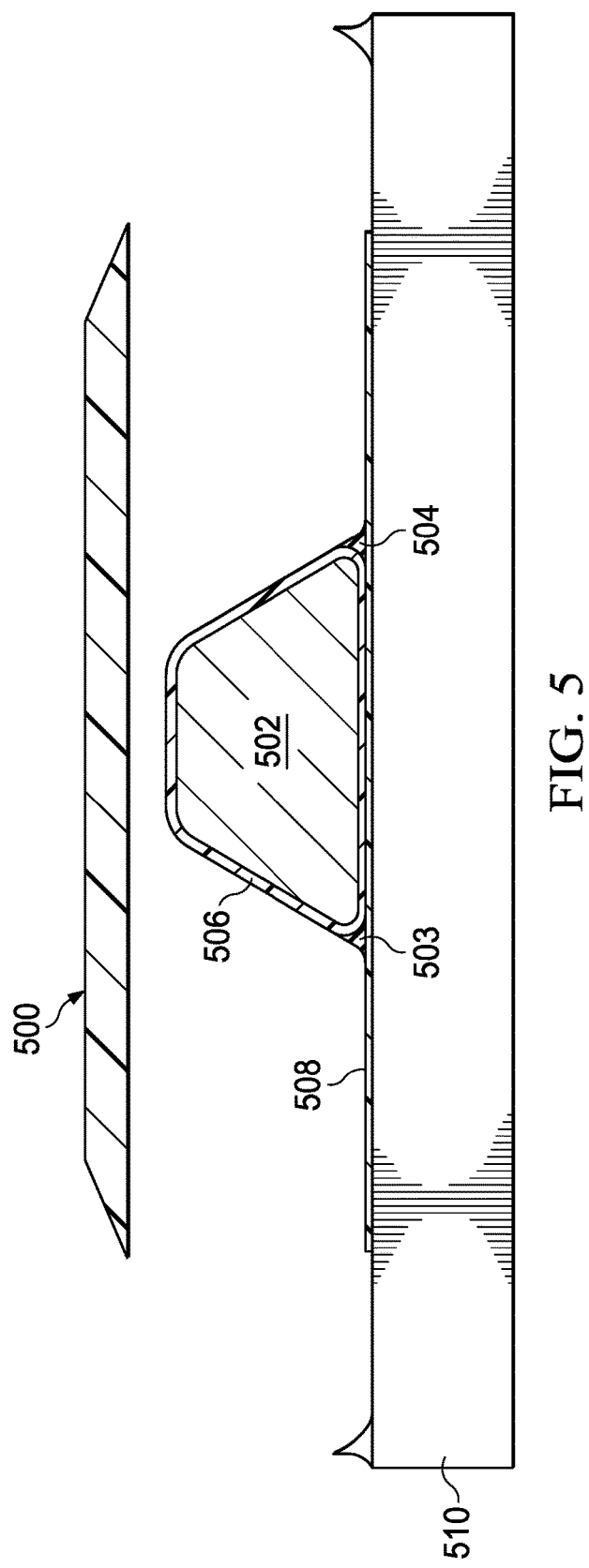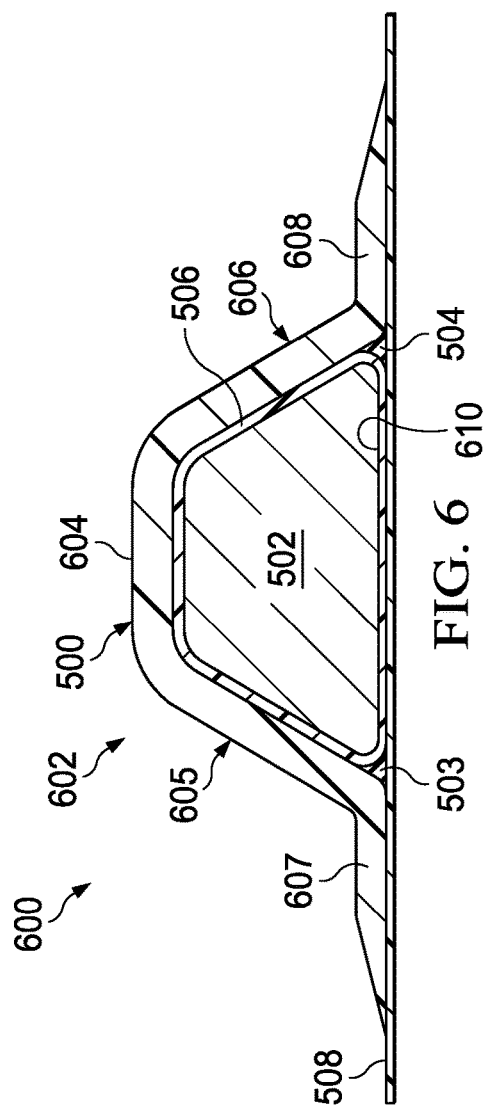
FIG. 5
FIG. 6

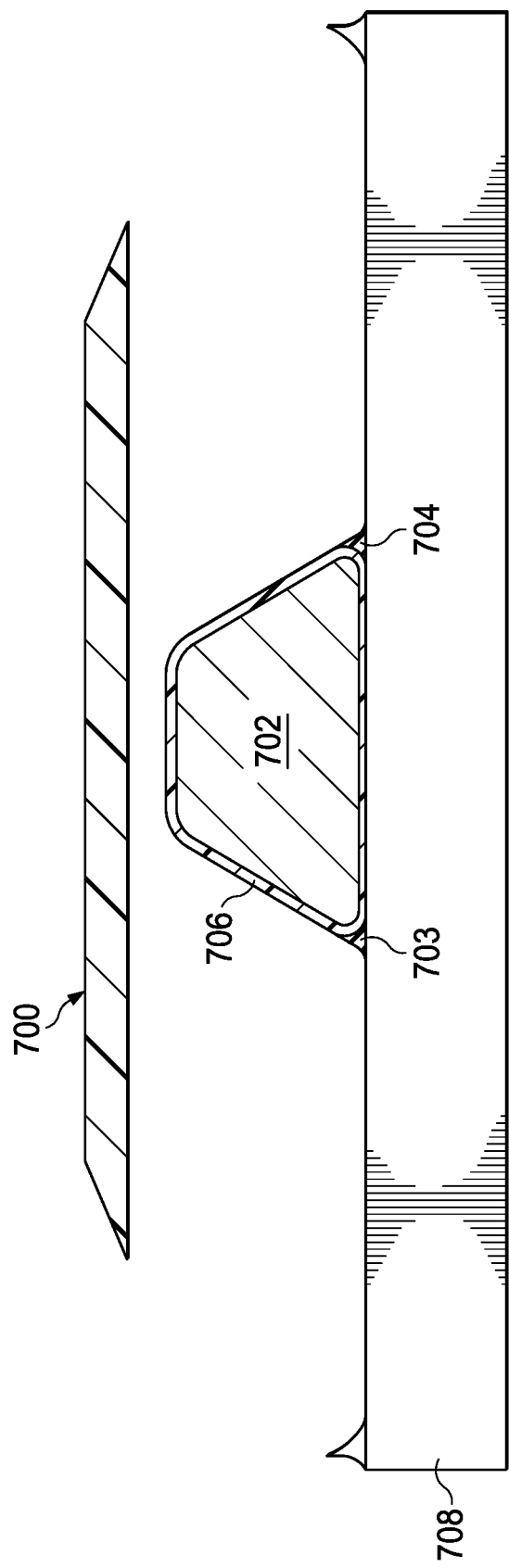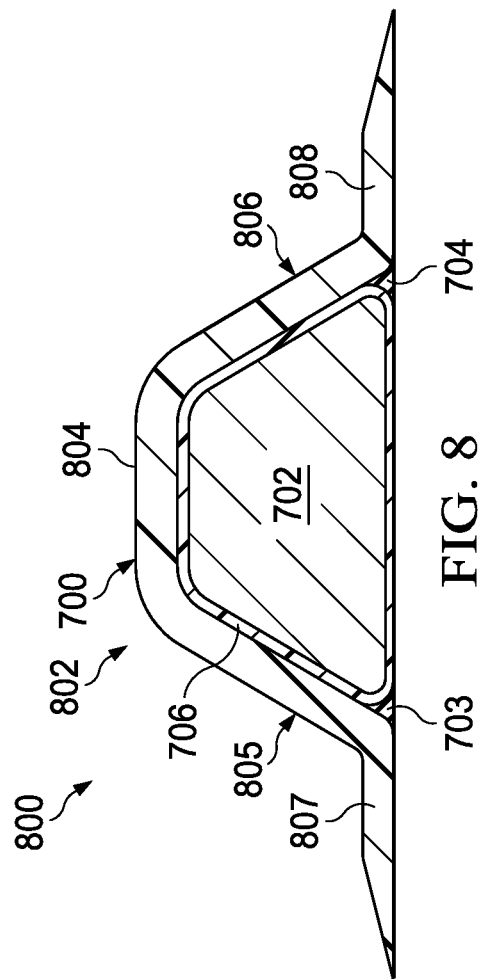

COMPACTED STRINGER PACKAGES

BACKGROUND INFORMATION

1. Field

The present disclosure relates generally to manufacturing and, in particular, to composite manufacturing. More particularly, the present disclosure relates to a method and apparatus for composite manufacturing with compacted stringer packages.

2. Background

Aircraft generally include an airframe, which may be regarded as an underlying skeleton to which skins are attached to form a smooth aerodynamic outer surface. Stringers of various shapes may be used for stiffening fuselage sections and wing skins on aircraft. Composite materials are used in aircraft to decrease the weight of the aircraft. Modern aircraft may include both composite stringers and composite skins.

Conventionally, composite stringers are attached to a composite skin using fasteners, curing the composite stringers to the composite skin, or a combination of the two. In some conventional processes, composite stringers are assembled on a cure tool common to both the composite stringers and the composite skin.

The cure tool common to the composite stringers and the composite skin is large enough to form a portion of a fuselage. The cure tool may therefore have a large manufacturing footprint. The large manufacturing footprint limits the quantity of cure tools that fit within a manufacturing environment.

To assemble the composite stringers on the cure tool, a number of processes are performed, each of which has an associated performance time. Each stringer component is laid onto the cure tool and then compacted separately. Each process associated with assembling the composite stringers adds to an overall manufacturing time. Manufacturing time may limit a quantity of aircraft produced. Therefore, it would be desirable to have a method and apparatus that take into account at least some of the issues discussed above, as well as other possible issues.

SUMMARY

An illustrative embodiment of the present disclosure provides a method. A composite charge is placed over a forming and cure mandrel, a first radius filler, and a second radius filler. Mechanical pressure is applied to shape the composite charge to the forming and cure mandrel and a rigid base to form a stringer layup. Vacuum pressure is applied to the stringer layup to form a compacted stringer package having a hat-shaped cross-section.

Another illustrative embodiment of the present disclosure provides a method. A plurality of compacted stringer packages is formed, each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section. The plurality of compacted stringer packages is placed onto a cure tool.

A further illustrative embodiment of the present disclosure provides a compacted stringer package. The compacted stringer package comprises a composite charge, a first radius filler, a second radius filler, and a forming and cure mandrel. The composite charge has a hat-shaped cross-section. The first radius filler contacts the composite charge. The second radius filler contacts the composite charge. The forming and cure mandrel is positioned within a cap, a first web, and a second web of the hat-shaped cross-section.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of components of a composite stringer package prior to compacting in accordance with an illustrative embodiment;

FIG. 6 is an illustration of a compacted stringer package in accordance with an illustrative embodiment;

FIG. 7 is an illustration of components of a composite stringer package prior to compacting in accordance with an illustrative embodiment;

FIG. 8 is an illustration of a compacted stringer package in accordance with an illustrative embodiment;

DETAILED DESCRIPTION

Figure 1:
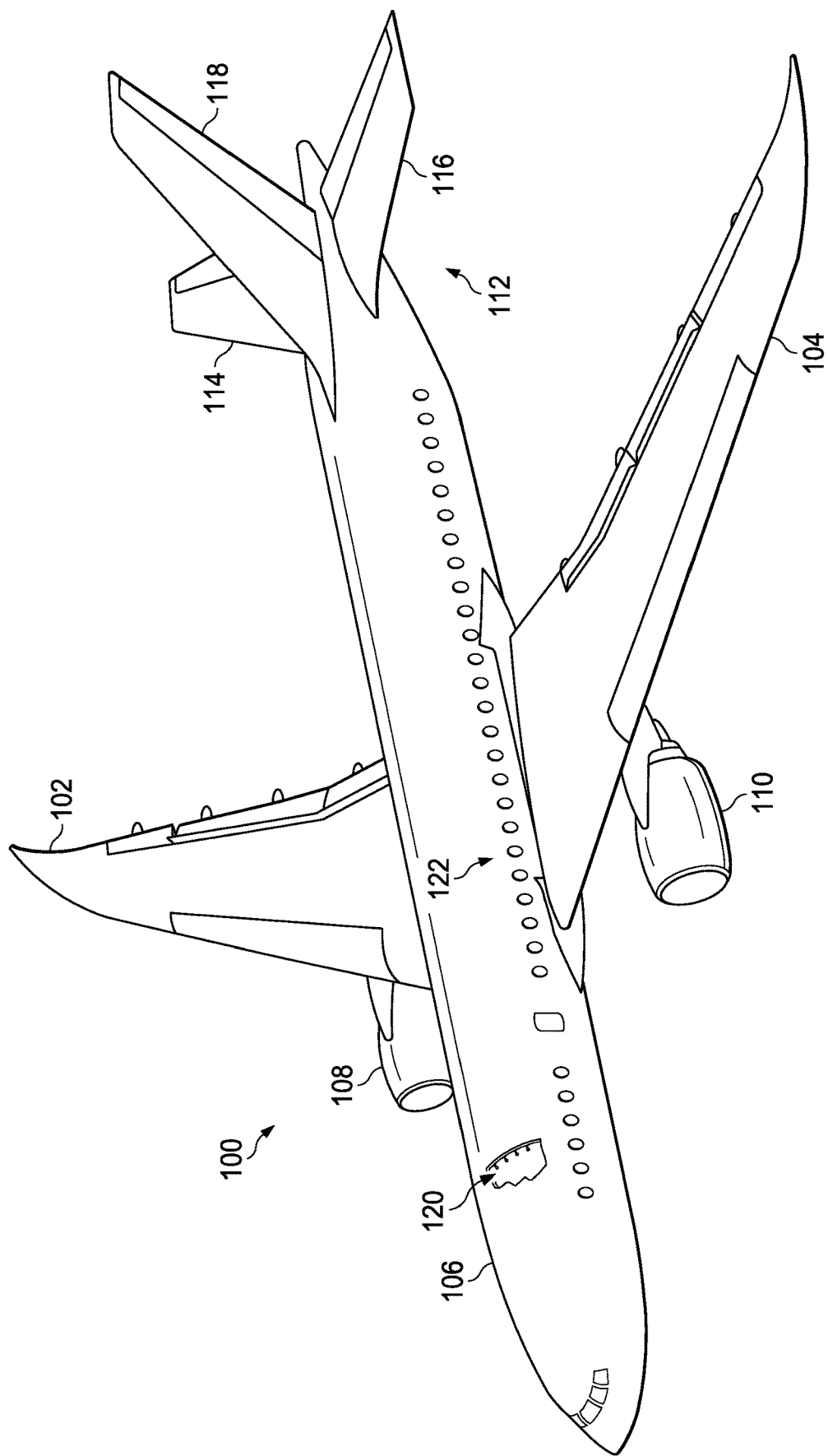
FIG. 1 is an illustration of an aircraft in which an illustrative embodiment may be implemented.

The illustrative embodiments recognize and take into account one or more different considerations. For example, the illustrative embodiments recognize and take into account that composite materials are used in aircraft to decrease weight of the aircraft. This decreased weight improves performance features such as payload capacity and fuel efficiency. Further, composite materials provide longer service life for various components in an aircraft.

The illustrative embodiments recognize and take into account that composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

The illustrative examples recognize and take into account that composite stringers may be attached to a composite skin using fasteners, curing the composite stringers to the composite skin, or by other desirable methods. The illustrative examples recognize and take into account that the fasteners add to the weight of the aircraft. The illustrative examples thus recognize and take into account that curing the composite stringers to the composite skin is a desirable attachment method.

The illustrative examples recognize and take into account that laying the composite material onto a large cure tool is a time limiting step. Laying the composite material is a layered process. The illustrative examples recognize and take into account that forming composite portions offline from the cure tool may reduce manufacturing time. For example, forming multiple composite stringers offline from the cure tool may reduce the manufacturing time.

The illustrative examples recognize and take into account that a fuselage of an aircraft has a contour. The illustrative examples recognize and take into account that the composite stringers have curvatures to match the contour of the fuselage.

The illustrative examples recognize and take into account that manufacturing tooling is stored when not in use. The illustrative examples thus recognize and take into account that increasing a quantity of manufacturing tools increases storage volume for the manufacturing tools.

The illustrative examples recognize and take into account that interchangeable parts and assembly line processing reduces storage volume. Further, the illustrative examples recognize and take into account that the interchangeable parts and the assembly line processing may reduce complexity of forming a structure. The illustrative examples recognize and take into account that substantially similar composite stringers, such as substantially straight composite stringer lay-ups, may be formed using an assembly line.

The illustrative examples further recognize and take into account that bending complex composite structures, such as the composite stringers, to contours may introduce wrinkles into the composite material. For example, the illustrative examples recognize and take into account that the wrinkles may be introduced into a composite stringer lay-up when forming the composite stringer lay-up to a complex contour of the cure tool. The illustrative examples recognize and take into account that the wrinkles affect the performance of the composite material. The illustrative examples recognize and take into account that the wrinkles may be undesirably difficult to detect.

The illustrative examples recognize and take into account that support is desirably provided to hollow portions of composite materials during curing. For example, rigid tooling or pressurized tooling, such as bladders, may be present in hollow portions of the composite materials during curing.

The illustrative examples recognize and take into account that eliminating any of additional curing steps, additional consolidation steps, or additional layup steps will reduce the manufacturing time. The illustrative examples thus recognize and take into account that consolidating multiple layers of the composite material simultaneously may reduce the manufacturing time. The illustrative examples further recognize and take into account that tooling, which serves multiple purposes, may reduce at least one of the manufacturing time or the manufacturing expense.

The illustrative examples recognize and take into account that in conventional fuselage manufacturing, a consolidated composite section having a hat-shaped cross-section may be placed into a cure tool. Once in the cure tool, any forming tooling still present is removed from the consolidated composite section. After removing the forming tooling, a curing mandrel or a curing bladder is placed into the consolidated composite section. After placing the curing mandrel or the curing bladder, a first radius filler and a second radius filler are positioned in the consolidated composite section. Conventionally, these steps are performed on the cure tool. The illustrative embodiments recognize and take into account that each subsequent step performed on the cure tool increases the amount of manufacturing time to form a component using the cure tool.

The illustrative examples recognize and take into account that forming a stringer onto the tool that holds the cavity shape during cure is not a current practice. The illustrative examples further recognize and take into account that incorporating the first radius filler and the second radius filler into the forming process is not a current process.

With reference now to the Figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft manufactured using compacted stringer packages in accordance with an illustrative embodiment. For example, body 106 may be manufactured using compacted stringer packages. FIG. 1 depicts an exposed view of stiffeners 120. Stiffeners 120 are examples of stringers manufactured using compacted stringer packages.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
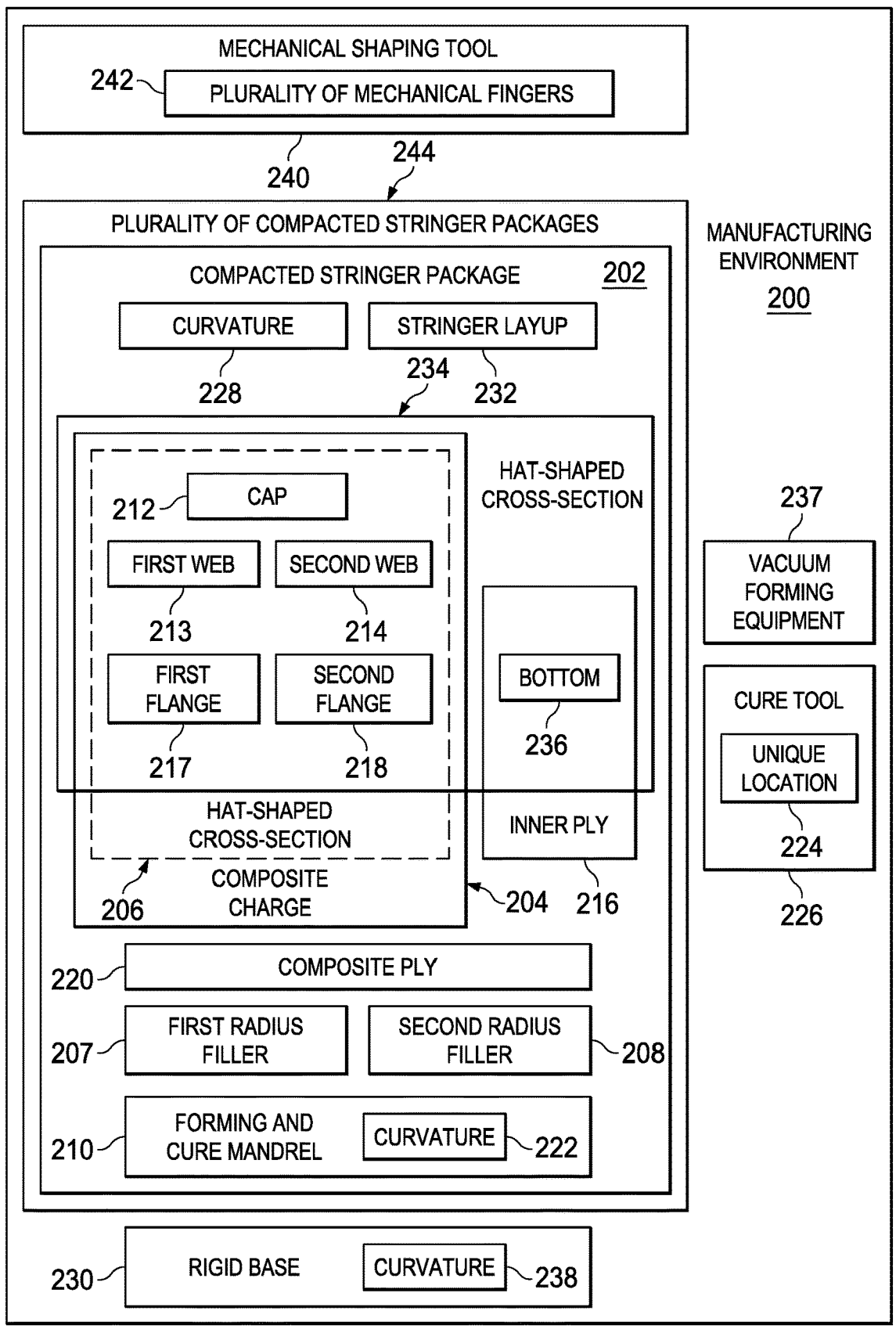
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 of FIG. 1 may be formed in manufacturing environment 200. For example, stiffeners 120 of FIG. 1 of aircraft 100 are laid up in manufacturing environment 200.

Compacted stringer package 202 is formed in manufacturing environment 200. Compacted stringer package 202 comprises composite charge 204 having hat-shaped cross-section 206, first radius filler 207 contacting composite charge 204, second radius filler 208 contacting composite charge 204, and forming and cure mandrel 210 positioned within cap 212, first web 213 and second webs 214 of hat-shaped cross-section 206. Cap 212 is positioned between first web 213 and second web 214. First radius filler 207 and second radius filler 208 are positioned on either side of cap 212.

In some illustrative examples, compacted stringer package 202 comprises inner ply 216 connecting first flange 217 and second flange 218 of hat-shaped cross-section 206 and contacting first radius filler 207 and second radius filler 208. First flange 217 is connected to first web 213. Second flange 218 is connected to second web 214. First flange 217 and second flange 218 are on opposite sides of cap 212.

Inner ply 216 is optional to compacted stringer package 202. When present, inner ply 216 helps maintain the shape of compacted stringer package 202. In some illustrative examples, inner ply 216 may be referred to as an "inner mold line" (IML) ply.

In some illustrative examples, compacted stringer package 202 comprises composite ply 220 wrapped around forming and cure mandrel 210. Composite ply 220 is optional to compacted stringer package 202. Composite ply 220 may also be referred to as a "wrap ply." When present, composite ply 220 helps maintain the shape of compacted stringer package 202.

Forming and cure mandrel 210 of compacted stringer package 202 comprises at least one of a collapsible mandrel, a dissolvable material, a solid mandrel, or an inflatable bladder. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, a collapsible mandrel includes foam portions and a rigid center. Collapsing the foam portions of the collapsible mandrel allows for removable of forming and cure mandrel 210 from the remainder of compacted stringer package 202.

When forming and cure mandrel 210 includes an inflatable bladder, the inflatable bladder is formed of any desirable material. An inflatable bladder may be a polymeric material, metallic material, or any other desirable airtight material.

In some illustrative examples, forming and cure mandrel 210 of compacted stringer package 202 has curvature 222 in at least one of an X-Y axis, X-Z axis, or Y-Z axis. In some illustrative examples, curvature 222 is unique to forming and cure mandrel 210. Curvature 222 is designed based on unique location 224 for compacted stringer package 202 on cure tool 226.

Curvature 222 of forming and cure mandrel 210 imparts curvature 228 to compacted stringer package 202. Curvature 222 in the Y-Z plane will be referred to as roll (twist), curvature 222 in the X-Z plane will be referred to as pitch, and curvature 222 in the X-Y plane will be referred to as yaw.

In some illustrative examples, forming and cure mandrel 210 remains in compacted stringer package 202 during curing of compacted stringer package 202 on cure tool 226. In these illustrative examples, forming and cure mandrel 210 is configured to function as a curing bladder.

To form compacted stringer package 202, composite charge 204 is placed over forming and cure mandrel 210, first radius filler 207, and second radius filler 208. When composite ply 220 is present, composite charge 204 contacts composite ply 220, first radius filler 207, and second radius filler 208. When composite ply 220 is not present, composite charge 204 contacts forming and cure mandrel 210, first radius filler 207, and second radius filler 208.

After placing composite charge 204, mechanical pressure is applied to shape composite charge 204 to forming and cure mandrel 210 and rigid base 230 to form stringer layup 232. Vacuum pressure is applied to stringer layup 232 to form compacted stringer package 202 having hat-shaped cross-section 234.

In some illustrative examples, components of a resulting compacted stringer package 202, such as composite charge 204, are ambient temperature while at least one of the mechanical pressure and the vacuum pressure is applied. In other illustrative examples, composite charge 204 or another component of compacted stringer package 202 may be heated while at least one of the mechanical pressure or the vacuum pressure is applied.

Hat-shaped cross-section 234 comprises cap 212 first web 213, and second web 214, one on each side of cap, shaped by forming and cure mandrel 210, and first flange 217 and second flange 218, shaped by rigid base 230. When inner ply 216 is present, hat-shaped cross-section 234 further comprises bottom 236 connecting first flange 217 and second flange 218 and extending underneath cap 212 and first web 213 and second web 214. The vacuum pressure is supplied using vacuum forming equipment 237. Vacuum forming equipment 237 may include at least one of a vacuum bag, a number of seals, tubing, and a vacuum source.

Compacted stringer package 202 is uncured but substantially rigid. Compacted stringer package 202 is rigid enough for transporting within manufacturing environment 200. In some illustrative examples, the mechanical pressure and the vacuum pressure are applied substantially simultaneously.

When composite ply 220 is present, composite ply 220 is wrapped around forming and cure mandrel 210 prior to placing composite charge 204 over forming and cure mandrel 210, first radius filler 207, and second radius filler 208 such that at least one of applying mechanical pressure to shape composite charge 204 or applying vacuum pressure to stringer layup 232 adheres composite charge 204 to composite ply 220. When composite ply 220 is present, composite ply 220 has a trapezoidal cross-section formed by the cross-section of forming and cure mandrel 210.

When inner ply 216 is present, inner ply 216 is placed onto rigid base 230. First radius filler 207 and second radius filler 208 are placed onto inner ply 216 on rigid base 230. Forming and cure mandrel 210 is placed onto inner ply 216 prior to placing composite charge 204 over forming and cure mandrel 210.

After forming compacted stringer package 202, compacted stringer package 202 is removed from rigid base 230. When forming and cure mandrel 210 has curvature 222, rigid base 230 has curvature 238 complementing curvature 222.

Compacted stringer package 202 is then placed into cure tool 226. After curing compacted stringer package 202, forming and cure mandrel 210 is removed from compacted stringer package 202.

The mechanical pressure is applied using mechanical shaping tool 240. Mechanical shaping tool 240 may take any desirable configuration. In one illustrative example, applying the mechanical pressure comprises pressing composite charge 204 using plurality of mechanical fingers 242 by sliding plurality of mechanical fingers 242 across composite charge 204.

Compacted stringer package 202 is one of plurality of compacted stringer packages 244. To form a composite structure, such as a portion of body 106 of FIG. 1, plurality of compacted stringer packages 244 is formed, each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section. Plurality of compacted stringer packages 244 is placed onto cure tool 226.

Plurality of compacted stringer packages 244 includes any quantity of compacted stringer packages. Although not depicted, plurality of compacted stringer packages 244 includes a respective composite charge having a hat-shaped cross-section, a first radius filler contacting the composite charge, a second radius filler contacting the composite charge, and a forming and cure mandrel positioned within a cap, a first web, and a second web of the hat-shaped cross-section for each respective compacted stringer package of plurality of compacted stringer packages 244.

In some illustrative examples, each of plurality of compacted stringer packages 244 has a curvature complementary to a unique location on cure tool 226. When each of plurality of compacted stringer packages 244 has a curvature complementary to a unique location, each of plurality of compacted stringer packages 244 has its own respective forming and cure mandrel and its own respective rigid base.

In these illustrative examples, forming plurality of compacted stringer packages 244 comprises placing a plurality of composite charges each over a respective forming and cure mandrel, a respective first radius filler, and a respective second radius filler. Each respective forming and cure mandrel has a complementary curvature to a respective rigid base.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, respective forming and cure mandrels for each of plurality of compacted stringer packages 244 are not depicted. Additionally, optional plies, inner ply 216 and composite ply 220, are both depicted in FIG. 2. In some illustrative examples, one or both of inner ply 216 and composite ply 220 are not present.

As another example, although not depicted in FIG. 2, manufacturing environment 200 may include a number of carriers, a number of shuttles, or other composite ply movement and placement equipment. As used herein, "a number of" is one or more items. For example, "a number of carriers" is one or more carriers. In some illustrative examples, at least one of composite charge 204, composite ply 220, inner ply 216, first radius filler 207, or second radius filler 208 may be moved and placed using equipment. In other illustrative examples, at least one of composite charge 204, composite ply 220, inner ply 216, first radius filler 207, or second radius filler 208 may be moved or placed by hand.

As yet another example, although not depicted in FIG. 2, manufacturing environment 200 may include movement equipment for moving compacted stringer package 202. In some illustrative examples, the movement equipment may move and place compacted stringer package 202 onto cure tool 226. In other illustrative examples, compacted stringer package 202 may be placed onto cure tool 226 by hand.

As a further example, although not depicted in FIG. 2, heating equipment may be present in manufacturing environment 200. In some illustrative examples, stringer layup 232 is heated while the vacuum pressure is applied to stringer layup 232 to form compacted stringer package 202 having hat-shaped cross-section 234. Heat may be applied using any desirable form of heating equipment. Heating of stringer layup 232 causes the composite material in stringer layup 232 to become more pliable than at room temperature. By heating stringer layup 232 while forming compacted stringer package 202, fewer inconsistencies may be present in compacted stringer package 202.

Figure 3:
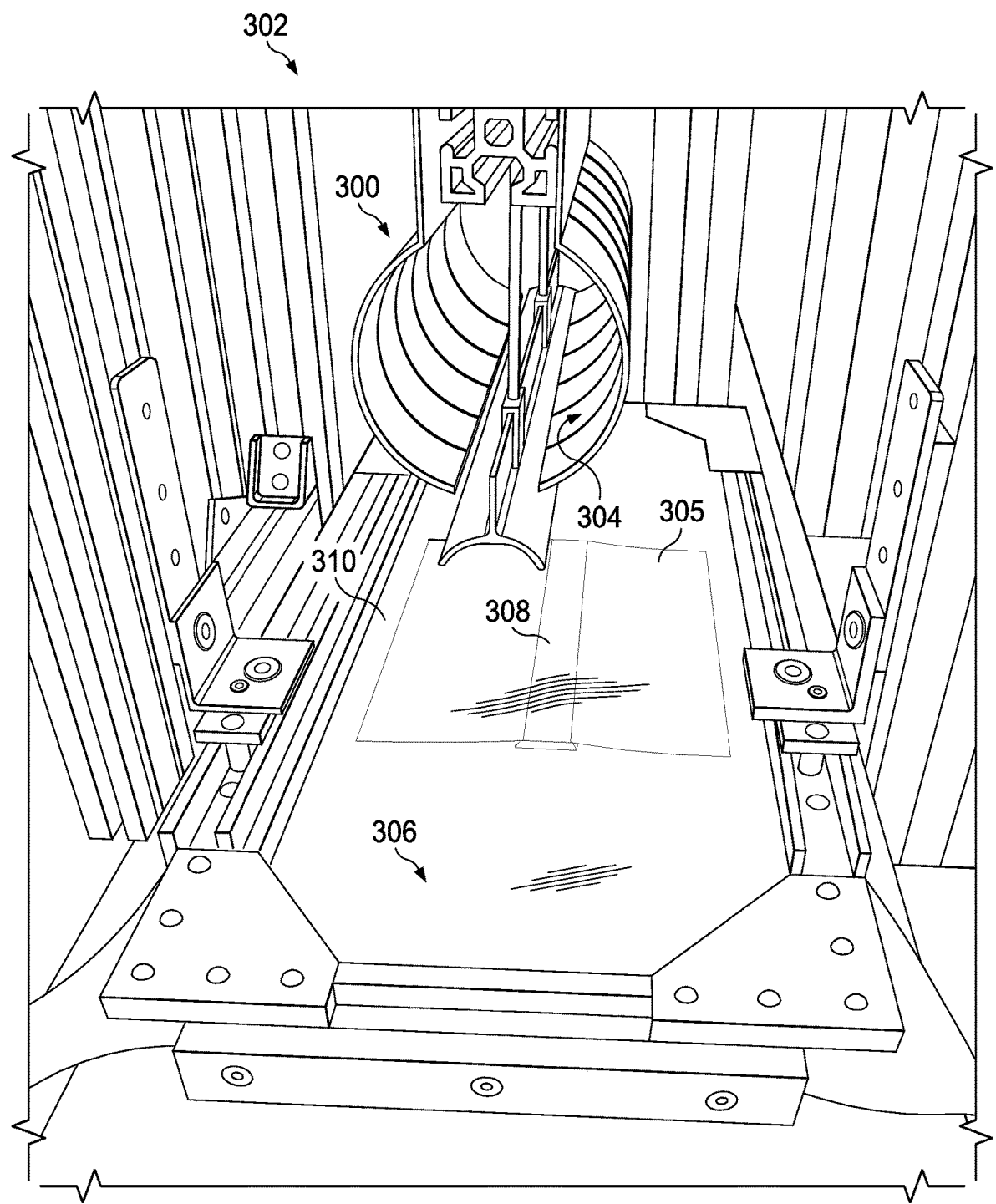
FIG. 3 is an illustration of a mechanical shaping tool in a manufacturing environment in accordance with an illustrative embodiment.

Turning now to FIG. 3, an illustration of a mechanical shaping tool in a manufacturing environment is depicted in accordance with an illustrative embodiment. Mechanical shaping tool 300 in manufacturing environment 302 is a physical implementation of mechanical shaping tool 240 of FIG. 2.

Mechanical shaping tool 300 includes plurality of mechanical fingers 304 that slide across composite charge 305 on rigid base 306. Mechanical fingers 304 may have any desirable shape and be actuated by any desirable force. As depicted, composite charge 305 and forming and cure mandrel 308 are present between rigid base 306 and vacuum bag 310. Forming and cure mandrel 308 is present to shape composite charge 305 on rigid base 306.

Figure 4:
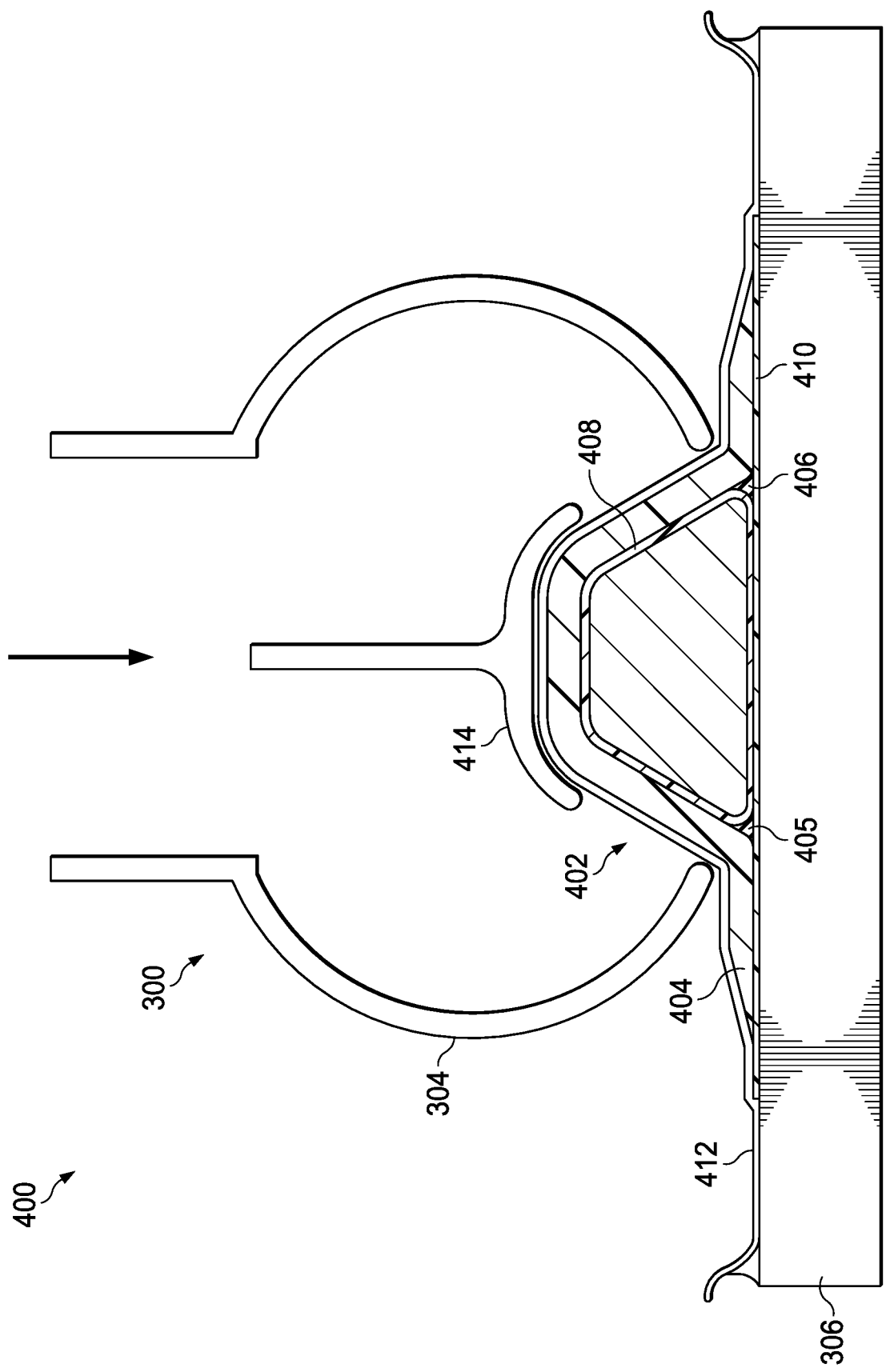
FIG. 4 is an illustration of a stringer layup in a mechanical shaping tool in accordance with an illustrative embodiment.

Turning now to FIG. 4, an illustration of a stringer layup in a mechanical shaping tool is depicted in accordance with an illustrative embodiment. View 400 is an illustration of mechanical shaping tool 300 while compacting stringer layup 402. Stringer layup 402 includes composite charge 404, first radius filler 405, second radius filler 406, wrap ply 408, and inner ply 410. Although both wrap ply 408 and inner ply 410 are present in stringer layup 402, wrap ply 408 and inner ply 410 are both optional.

As depicted, plurality of mechanical fingers 304 slide across composite charge 404 on rigid base 306. Plurality of mechanical fingers 304 applies mechanical pressure to composite charge 404 to shape and compact composite charge 404.

Vacuum pressure is applied to stringer layup 402 under vacuum bag 412. The vacuum pressure and the mechanical pressure may be substantially simultaneously applied. In some illustrative examples, the vacuum pressure may remain on stringer layup 402 longer than the mechanical pressure.

The illustrations of mechanical shaping tool 300 in FIGS. 3 and 4 are not meant to imply physical or architectural limitations to the manner in which an illustrative embodiment may be implemented. Mechanical shaping tool 300 is only one physical implementation of mechanical shaping tool 240 of FIG. 2. For example, mechanical shaping tool 300 may have any desirable number and shape of mechanical fingers.

In some illustrative examples, cap forming portion 414 of mechanical shaping tool 300 may have a different shape. In some illustrative examples, mechanical shaping tool 240 may include a diaphragm or inflatable bladder to apply the mechanical pressure to stringer layup 402.

Turning now to FIG. 5, an illustration of components of a composite stringer package prior to compacting is depicted in accordance with an illustrative embodiment. Composite charge 500 is a physical implementation of composite charge 204 of FIG. 2. Composite charge 500 is placed over forming and cure mandrel 502, first radius filler 503, and second radius filler 504. Forming and cure mandrel 502 is a physical implementation of forming and cure mandrel 210 of FIG. 2. First radius filler 503 and second radius filler 504 are physical implementations of first radius filler 207 and second radius filler 208 of FIG. 2.

As depicted, composite ply 506 is wrapped around forming and cure mandrel 502. Composite ply 506 is a physical implementation of composite ply 220 of FIG. 2. By placing composite charge 500 over forming and cure mandrel 502, composite charge 500 is positioned such that composite charge 500 contacts composite ply 506.

Inner ply 508 is positioned on rigid base 510. Inner ply 508 is a physical implementation of inner ply 216 of FIG. 2. Rigid base 510 is a physical implementation of rigid base 230 of FIG. 2.

In FIG. 5, mechanical pressure and vacuum pressure have not yet been applied. In FIG. 5, the components are not compacted.

Turning now to FIG. 6, an illustration of a compacted stringer package is depicted in accordance with an illustrative embodiment. Compacted stringer package 600 is a compacted structure formed of components shown in FIG. 5.

Compacted stringer package 600 includes composite charge 500, forming and cure mandrel 502, first radius filler 503, second radius filler 504, composite ply 506, and inner ply 508. Compacted stringer package 600 is sufficiently rigid to transport compacted stringer package 600 without rigid base 510. Compacted stringer package 600 may be picked up as a whole and placed into a cure tool (not depicted) as a whole.

Compacted stringer package 600 has hat-shaped cross-section 602. Hat-shaped cross-section 602 includes cap 604, first web 605, second web 606, first flange 607, second flange 608, and bottom 610. As depicted, composite ply 506 and inner ply 508 form a portion of bottom 610 of hat-shaped cross-section 602 connecting first flange 607 and second flange 608.

Turning now to FIG. 7, an illustration of components of a composite stringer package prior to compacting is depicted in accordance with an illustrative embodiment. Composite charge 700 is a physical implementation of composite charge 204 of FIG. 2. Composite charge 700 is placed over forming and cure mandrel 702, first radius filler 703, and second radius filler 704. Forming and cure mandrel 702 is a physical implementation of forming and cure mandrel 210 of FIG. 2. First radius filler 703 and second radius filler 704 are a physical implementation of first radius filler 207 and second radius filler 208 of FIG. 2.

As depicted, composite ply 706 is wrapped around forming and cure mandrel 702. Composite ply 706 is a physical implementation of composite ply 220 of FIG. 2. By placing composite charge 700 over forming and cure mandrel 702, composite charge 700 is positioned such that composite charge 700 contacts composite ply 706.

First radius filler 703, second radius filler 704, and a portion of composite ply 706 each contact rigid base 708. Rigid base 708 is a physical implementation of rigid base 230 of FIG. 2.

In FIG. 7, mechanical pressure and vacuum pressure have not yet been applied. In FIG. 7, the components are not compacted.

Turning now to FIG. 8, an illustration of a compacted stringer package is depicted in accordance with an illustrative embodiment. Compacted stringer package 800 is a compacted structure formed of components shown in FIG. 7.

Compacted stringer package 800 includes composite charge 700, forming and cure mandrel 702, first radius filler 703, second radius filler 704, and composite ply 706. Compacted stringer package 800 is sufficiently rigid to transport compacted stringer package 800 without rigid base 708. Compacted stringer package 800 may be picked up as a whole and placed into a cure tool (not depicted) as a whole.

Compacted stringer package 800 has hat-shaped cross-section 802. Hat-shaped cross-section 802 includes cap 804, first web 805, second web 806, first flange 807 and second flange 808.

Figure 9:
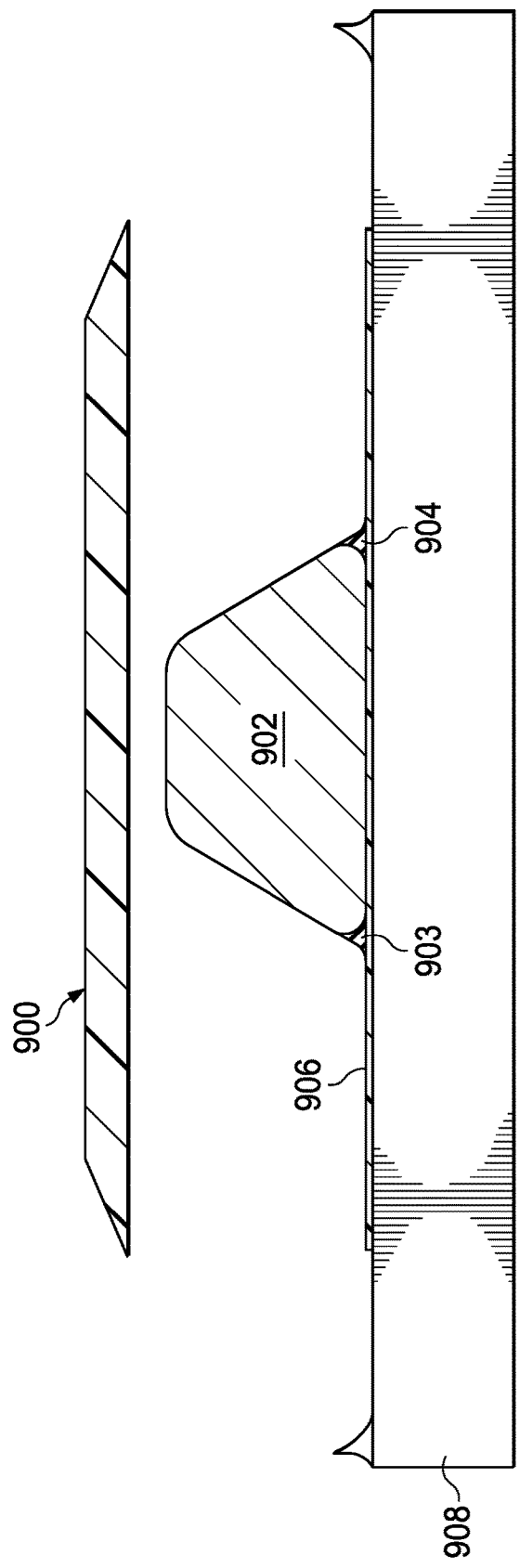
FIG. 9 is an illustration of components of a composite stringer package prior to compacting in accordance with an illustrative embodiment.

Turning now to FIG. 9, an illustration of components of a composite stringer package prior to compacting is depicted in accordance with an illustrative embodiment. Composite charge 900 is a physical implementation of composite charge 204 of FIG. 2. Composite charge 900 is placed over forming and cure mandrel 902, first radius filler 903, and second radius filler 904. Forming and cure mandrel 902 is a physical implementation of forming and cure mandrel 210 of FIG. 2. First radius filler 903 and second radius filler 904 are physical implementations of first radius filler 207 and second radius filler 208 of FIG. 2.

As depicted, inner ply 906 is positioned on rigid base 908. Inner ply 906 is a physical implementation of inner ply 216 of FIG. 2. Rigid base 908 is a physical implementation of rigid base 230 of FIG. 2.

In FIG. 9, mechanical pressure and vacuum pressure have not yet been applied. In FIG. 9, the components are not compacted.

Figure 10:
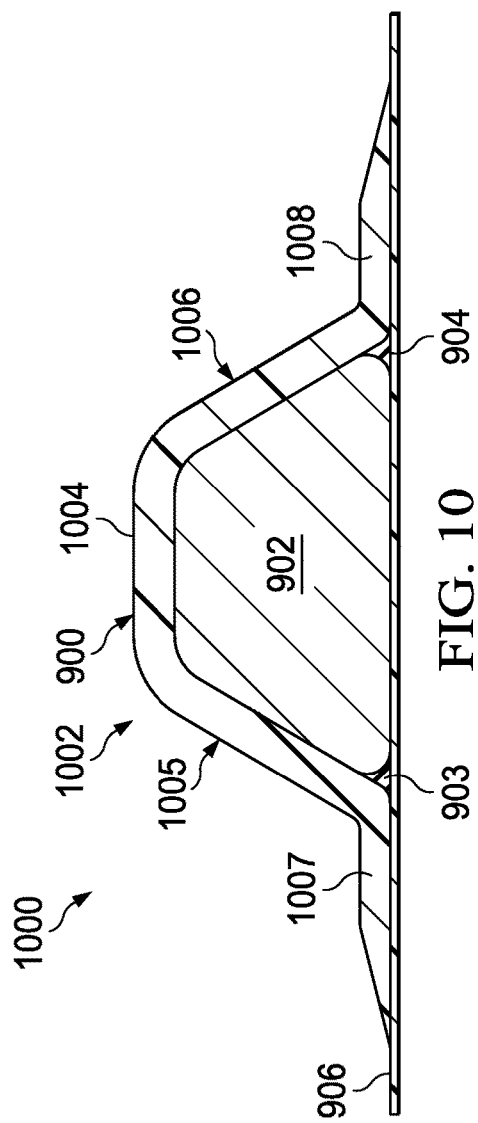
FIG. 10 is an illustration of a compacted stringer package in accordance with an illustrative embodiment.

Turning now to FIG. 10, an illustration of a compacted stringer package is depicted in accordance with an illustrative embodiment. Compacted stringer package 1000 is a compacted structure formed of components shown in FIG. 9.

Compacted stringer package 1000 includes composite charge 900, forming and cure mandrel 902, first radius filler 903, second radius filler 904, and inner ply 906. Compacted stringer package 1000 is sufficiently rigid to transport compacted stringer package 1000 without rigid base 908. Compacted stringer package 1000 may be picked up as a whole and placed into a cure tool (not depicted) as a whole.

Compacted stringer package 1000 has hat-shaped cross-section 1002. Hat-shaped cross-section 1002 includes cap 1004, first web 1005, second web 1006, first flange 1007, second flange 1008, and bottom 1010. As depicted, inner ply 906 forms a portion of bottom 1010 of hat-shaped cross-section 1002 connecting first flange 1007 and second flange 1008.

Figure 11:
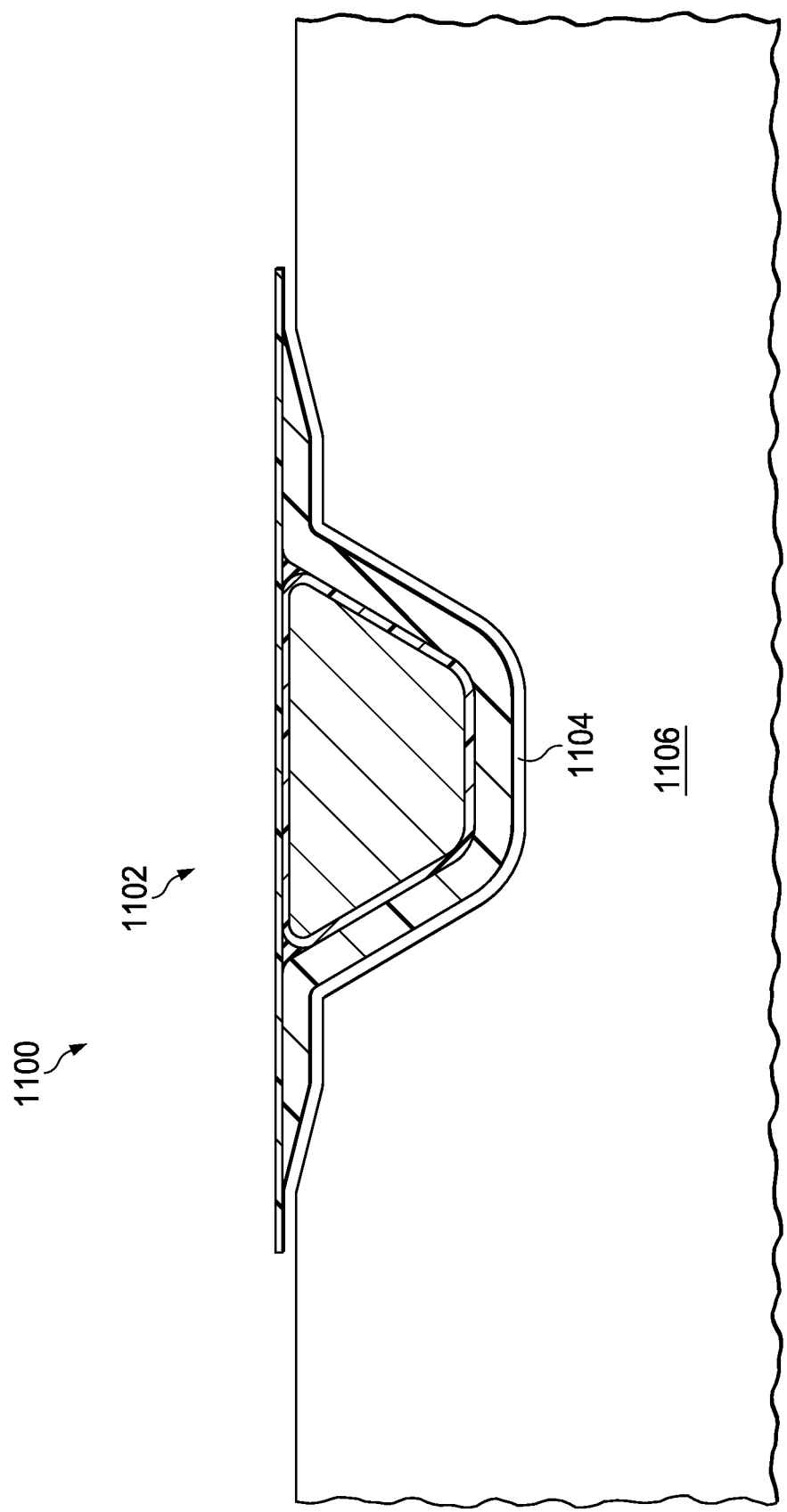
FIG. 11 is an illustration of a compacted stringer package placed onto a cure tool in accordance with an illustrative embodiment.

Turning now to FIG. 11, an illustration of a compacted stringer package placed onto a cure tool is depicted in accordance with an illustrative embodiment. In view 1100, compacted stringer package 1102 is placed into hollow 1104 of cure tool 1106. Hollow 1104 is a unique location of cure tool 1106. Compacted stringer package 1102 is designed to fit within hollow 1104. Compacted stringer package 1102 is complementary to any curvatures of hollow 1104.

After placing all desired compacted stringer packages onto cure tool 1106, a composite skin is placed over the compacted stringer packages. The composite skin and desired compacted stringer packages will then be co-cured on cure tool 1106.

Although compacted stringer package 1102 has a layup similar to compacted stringer package 600 of FIG. 6, compacted stringer package 1102 may have any desirable layup. For example, compacted stringer package 1102 may have a layup like compacted stringer package 800 of FIG. 8. In another example, compacted stringer package 1102 has a layup like compacted stringer package 1000 of FIG. 10.

Figure 12:
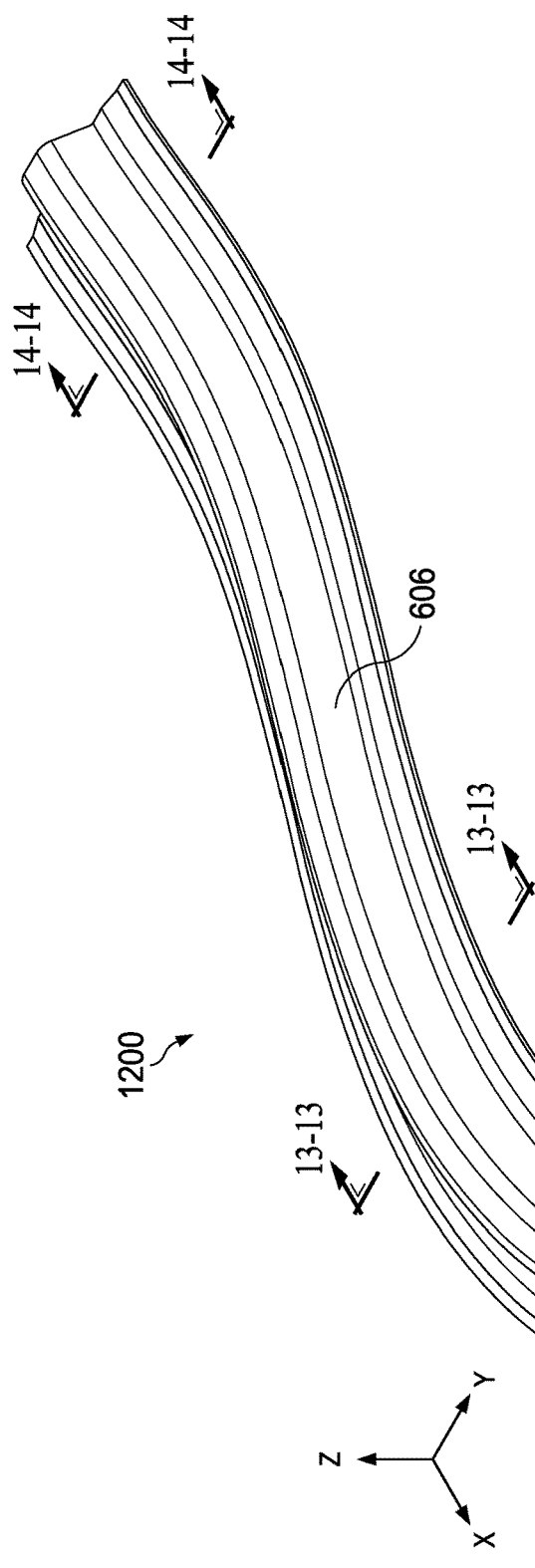
FIG. 12 is an illustration of a perspective view of a compacted stringer package having complex contours in accordance with an illustrative embodiment.

Turning now to FIG. 12, an illustration of a perspective view of a compacted stringer package having complex contours is depicted in accordance with an illustrative embodiment. View 1200 is a perspective view of compacted stringer package 600 of FIG. 6. Compacted stringer package 600 is a physical implementation of compacted stringer package 202 of FIG. 2. In view 1200, complex curvature of compacted stringer package 600 is visible.

Compacted stringer package 600 may have a number of complex contours along its length. The contours of compacted stringer package 600 may be constant or varying. As depicted, compacted stringer package 600 has curvatures in the X-Y plane and curvatures in the X-Z plane. Compacted stringer package 600 is also twisted. Compacted stringer package 600 may be twisted at a constant or varying angle θ.

Figure 14:
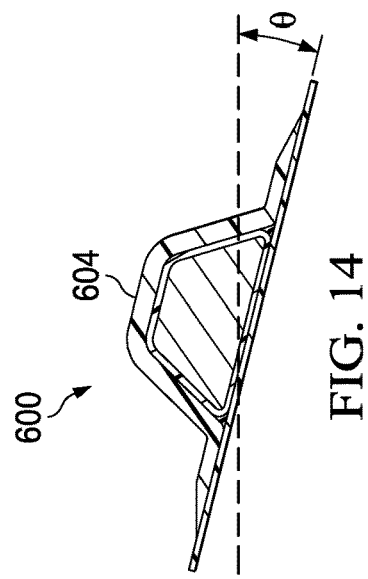
FIG. 14 is an illustration of a cross-sectional view of a compacted stringer package having complex contours in accordance with an illustrative embodiment.
Figure 13:
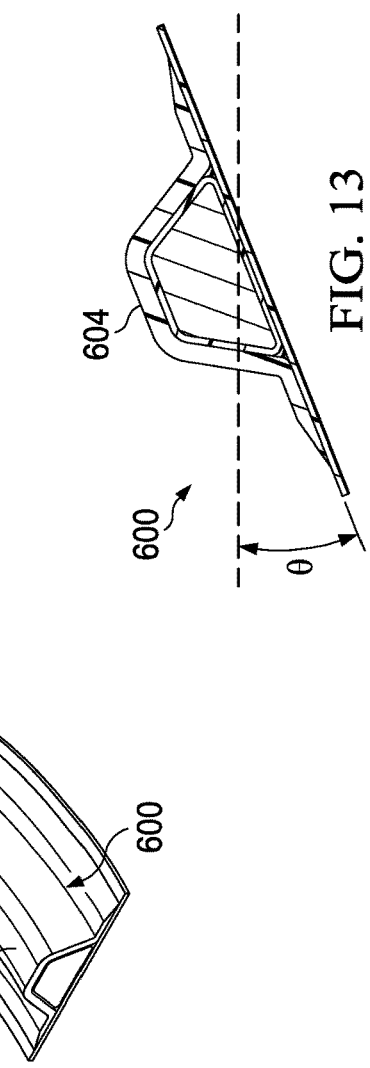
FIG. 13 is an illustration of a cross-sectional view of a compacted stringer package having complex contours in accordance with an illustrative embodiment.

Turning now to FIGS. 13 and 14, illustrations of cross-sectional views of a compacted stringer package having complex contours are depicted in accordance with an illustrative embodiment. Twists of compacted stringer package 600 within Y-Z plane are depicted in FIGS. 13 and 14.

Figure 15:
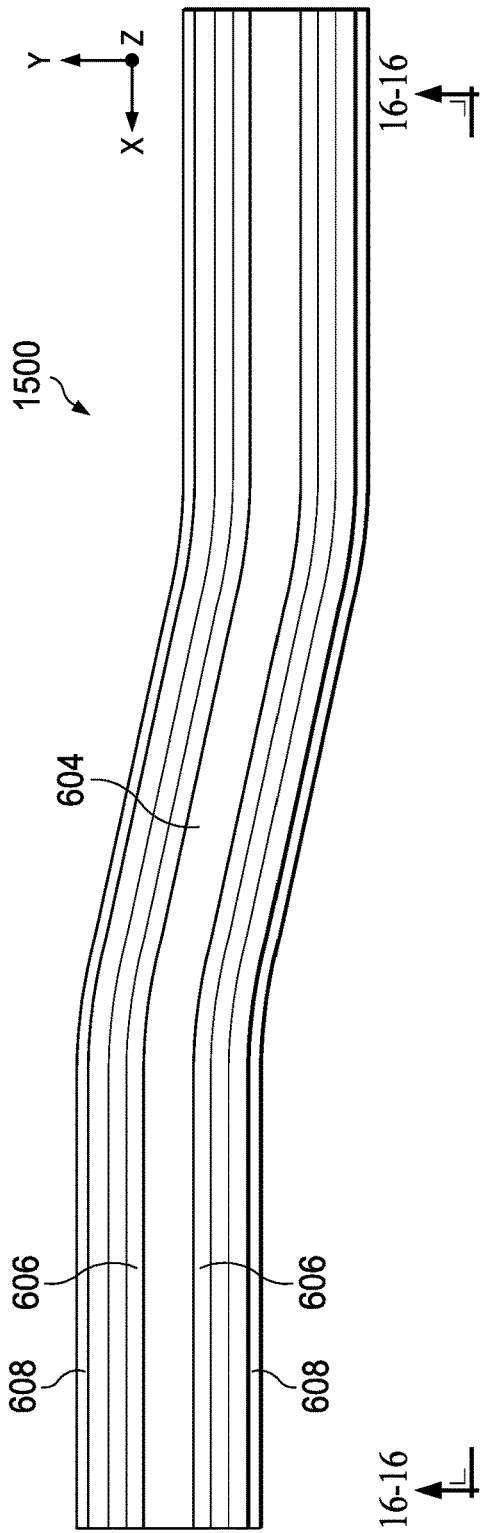
FIG. 15 is an illustration of a top view of a compacted stringer package having complex contours in accordance with an illustrative embodiment.

Turning now to FIG. 15, an illustration of a top view of a compacted stringer package having complex contours is depicted in accordance with an illustrative embodiment. View 1500 is a top view of compacted stringer package 600 depicting curvature in the X-Y plane.

Figure 16:
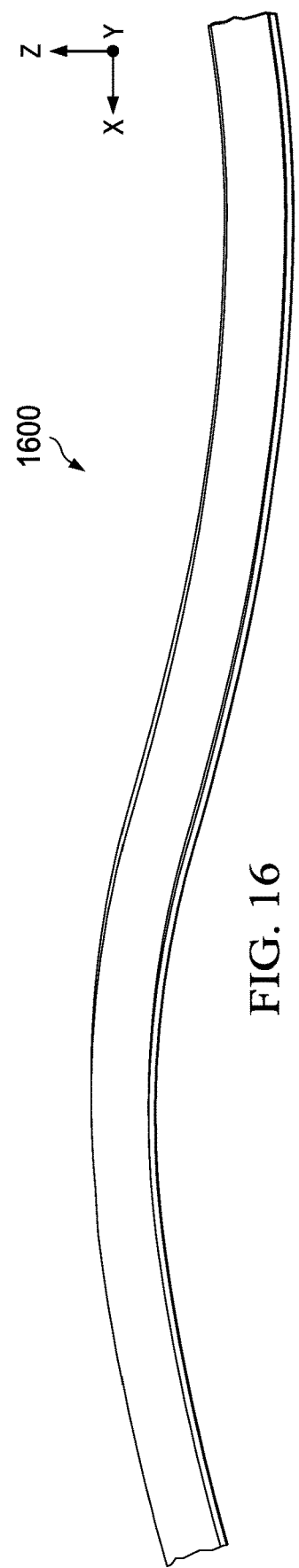
FIG. 16 is an illustration of a side view of a compacted stringer package having complex contours in accordance with an illustrative embodiment.

Turning now to FIG. 16, an illustration of a side view of a compacted stringer package having complex contours is depicted in accordance with an illustrative embodiment. View 1600 is a side view of compacted stringer package 600 depicting curvature in the X-Z plane.

The different components shown in FIGS. 1 and 3-16 may be combined with components in FIG. 2, used with components in FIG. 2, or a combination of the two. Additionally, some of the components in FIGS. 1 and 3-16 may be illustrative examples of how components shown in block form in FIG. 2 can be implemented as physical structures.

Figure 17:
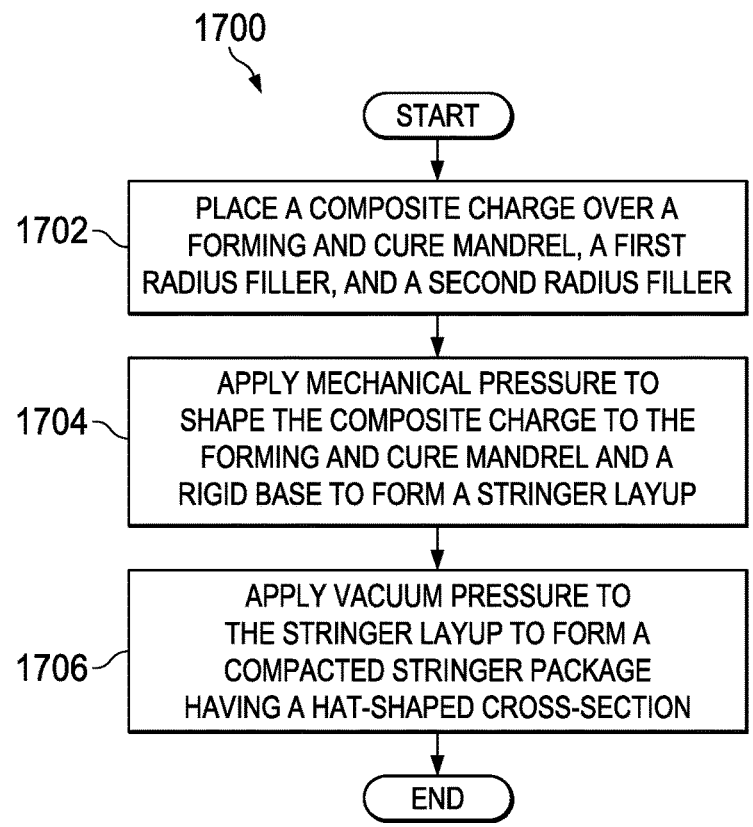
FIG. 17 is an illustration of a flowchart of a method for forming a compacted stringer package in accordance with an illustrative embodiment.

Turning now to FIG. 17, an illustration of a flowchart of a method for forming a compacted stringer package is depicted in accordance with an illustrative embodiment. Method 1700 may be used to form any of compacted stringer package 202 of FIG. 2, compacted stringer package 600 of FIGS. 6 and 12-16, compacted stringer package 800 of FIG. 8, or compacted stringer package 1000 of FIG. 10.

Method 1700 places a composite charge over a forming and cure mandrel, a first radius filler, and a second radius filler (operation 1702). Method 1700 applies mechanical pressure to shape the composite charge to the forming and cure mandrel and a rigid base to form a stringer layup (operation 1704). In some illustrative examples, applying the mechanical pressure comprises pressing the composite charge using a plurality of mechanical fingers by sliding the plurality of mechanical fingers across the composite charge.

Method 1700 applies vacuum pressure to the stringer layup to form a compacted stringer package having a hat-shaped cross-section (operation 1706). In some illustrative examples, the mechanical pressure and the vacuum pressure are applied substantially simultaneously. Afterwards, the process terminates.

In some illustrative examples, the hat-shaped cross-section comprises a cap, a first web, and a second web, shaped by the forming and cure mandrel. In some illustrative examples, the hat-shaped cross-section further comprises a first flange, and a second flange, shaped by the rigid base. In some illustrative examples, the hat-shaped cross-section further comprises a bottom connecting a first flange and a second flange and extending underneath the cap, the first web, and the second web.

Figure 18:
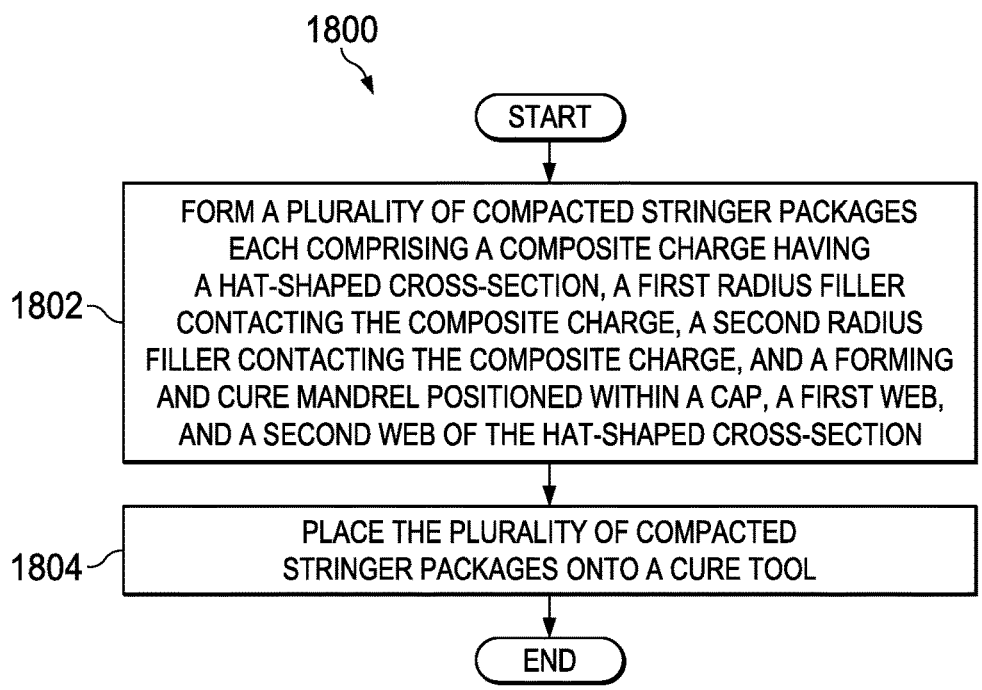
FIG. 18 is an illustration of a flowchart of a method for manufacturing using a plurality of compacted stringer packages in accordance with an illustrative embodiment.

Turning now to FIG. 18, an illustration of a flowchart of a method for manufacturing using a plurality of compacted stringer packages is depicted in accordance with an illustrative embodiment. Method 1800 may be performed using at least one of compacted stringer package 202 of FIG. 2, compacted stringer package 600 of FIGS. 6 and 12-16, compacted stringer package 800 of FIG. 8, or compacted stringer package 1000 of FIG. 10.

Method 1800 forms a plurality of compacted stringer packages each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section (operation 1802). In some illustrative examples, forming the plurality of compacted stringer packages comprises placing a plurality of composite charges each over a respective forming and cure mandrel, a respective first radius filler, and a respective second radius filler, applying mechanical pressure to shape each of the plurality of composite charges to the respective forming and cure mandrel and a respective rigid base to form stringer layups, and applying vacuum pressure to the stringer layups to form the plurality of compacted stringer packages each having the hat-shaped cross-section. In some of these illustrative examples, each respective forming and cure mandrel has a complementary curvature to a respective rigid base.

Method 1800 places the plurality of compacted stringer packages onto a cure tool (operation 1804). Afterwards, the process terminates. In some illustrative examples, each of the plurality of compacted stringer packages has a curvature complementary to a unique location on the cure tool. In some illustrative examples, one compacted stringer package is placed onto the cure tool at a time. In other illustrative examples, multiple compacted stringer packages are placed onto the cure tool at substantially the same time.

In some illustrative examples, the plurality of compacted stringer packages are placed onto the cure tool by a number of human operators. In other illustrative examples, the plurality of compacted stringer packages are placed onto the cure tool by a number of robots using automation.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, method 1700 of FIG. 17 further comprises wrapping a composite ply around the forming and cure mandrel prior to placing the composite charge over the forming and cure mandrel, the first radius filler, and the second radius filler, such that at least one of applying the mechanical pressure to shape the composite charge or applying the vacuum pressure to the stringer layup adheres the composite charge to the composite ply. In some illustrative examples, method 1700 further comprises placing an inner ply onto the rigid base, placing the first radius filler and the second radius filler onto the inner ply on the rigid base, and placing the forming and cure mandrel onto the inner ply prior to placing the composite charge over the forming and cure mandrel.

In some illustrative examples, method 1700 further comprises removing the compacted stringer package from the rigid base, and placing the compacted stringer package into a cure tool. In an illustrative example, method 1700 additionally further comprises removing the forming and cure mandrel from the compacted stringer package. In yet another illustrative example, method 1800 of FIG. 18 further comprises removing a respective forming and cure mandrel from each of the plurality of compacted stringer packages.

The illustrative examples provide methods and apparatus for composite manufacturing with stringers having hat-shaped cross-sections. The illustrative examples form compacted stringer packages having hat-shaped cross-sections.

In the illustrative examples, a finger former device may be used to form pre-preg hat-shaped stringers directly onto the bladder/mandrel that provides the inside geometry of the stringer. Also included in the forming is the radius filler (noodle) that interfaces with the skin. These components create a package of the stringer, the bladder/mandrel, and the noodle that is ready for installation. The finger-forming technology allows the stringer package to be formed to engineering contour, so that the stringer will not bend (and wrinkle) during installation.

By assembling the stringer package on a feeder-line, the illustrative examples remove significant flow time in the critical path of a fuselage build. By forming to a contour, the stringer inspection can take place at the forming station rather than on the cure tool.

The illustrative examples allow flexibility to use automation in the stringer fabrication feeder-line and stringer installation line. It also moves significant work out of the critical flow path. Thus, the illustrative examples reduce composite fabrication flow time and allow process automation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a compacted stringer package, the method comprising:
    placing a first radius filler, and a second radius filler alongside a forming and cure mandrel, configured for forming the compacted stringer package and supporting the compacting stringer package during curing, on a base of a mechanical shaping tool;
    subsequently placing a composite charge over: the forming and cure mandrel, the first radius filler, and the second radius filler on the base;
    after placing the composite charge over: the forming and cure mandrel, the first radius filler, and the second radius filler on the base, forming a stringer layup by conforming the composite charge to: the forming and cure mandrel, the first radius filler, the second radius filler, and the base, via using a shaping tool comprising a cap portion bracketed along opposing sides by respective pluralities of adjacent mechanical fingers comprising a semicircular shape and aligned along each length of the cap portion and ending in a tip applying mechanical pressure directly onto the composite charge against: the forming and cure mandrel, the first radius filler, the second radius filler;
    forming, by applying vacuum pressure to the stringer layup, the compacted stringer package comprising an uncured hat-shaped cross-section comprising a rigidity for transporting the compacted stringer package; and
    removing the compacted stringer package from the base.

2. The method of claim 1, further comprising:
    the base comprising a curvature;
    the forming and cure mandrel comprising a curvature complementary to the curvature of the base; and
    the uncured hat-shaped cross-section comprising a cap, a first web, and a second web shaped by the forming and cure mandrel, and wherein the uncured hat-shaped cross-section further comprises a first flange and a second flange shaped by the base.

3. The method of claim 2, wherein the uncured hat-shaped cross-section further comprises a bottom connecting the first flange and the second flange and extending underneath the cap, the first web, and the second web.

4. The method of claim 1, further comprising:
    wrapping a composite ply around the forming and cure mandrel prior to placing the composite charge over the forming and cure mandrel, the first radius filler, and the second radius filler; and
    adhering the composite charge to the composite ply via shaping the composite charge via at least one of: applying the mechanical pressure to the composite charge or applying the vacuum pressure to the stringer layup.

5. The method of claim 1, further comprising:
    placing an inner ply onto the base;
    placing the first radius filler and the second radius filler onto the inner ply on the base; and
    placing the forming and cure mandrel onto the inner ply prior to placing the composite charge over the forming and cure mandrel.

6. The method of claim 1, wherein the mechanical pressure and the vacuum pressure are applied substantially simultaneously.

7. The method of claim 1 further comprising:
removing the compacted stringer package from the base; and
placing the compacted stringer package into a cure tool.

8. The method of claim 7 further comprising:
removing the forming and cure mandrel from the compacted stringer package.

9. The method of claim 1, wherein the forming and cure mandrel and the base have complementing curvatures.

10. The method of claim 1, further comprising sliding the respective pluralities of adjacent mechanical fingers across the composite charge so as to conform the composite charge to the forming and cure mandrel, the first radius filler, the second radius filler, and the base.

11. A method comprising:
forming a plurality of compacted stringer packages on a plurality of respective bases of mechanical forming tools, each compacted stringer package formed by:
placing a first radius filler, and a second radius filler alongside a forming and cure mandrel, configured for forming the compacted stringer package and supporting the compacting stringer package during curing, on a base; and
subsequently, placing a composite charge over: the first radius filler contacting the composite charge, the second radius filler contacting the composite charge, and the forming and cure mandrel;
subsequently, using a shaping tool comprising a cap portion bracketed along opposing sides by respective pluralities of adjacent mechanical fingers comprising a semicircular shape and aligned along each length of the cap portion and ending in a tip directly applying mechanical pressure to the composite charge against: the forming and cure mandrel, the first radius filler, and the second radius filler, and conforming the composite charge into: a cap, a first web, and a second web of a hat-shaped cross-section; and
removing the plurality of compacted stringer packages from the respective bases and placing the plurality of compacted stringer packages onto a cure tool.

12. The method of claim 11, further comprising:
each of the plurality of compacted stringer packages comprises curvatures in a Y-Z plane and an X-Z plane complementary to a curvature on a respective base and to a unique location on the cure tool.

13. The method of claim 11, wherein forming the plurality of compacted stringer packages comprises:
placing a plurality of composite charges each over a respective forming and cure mandrel, respective first radius filler, and respective second radius filler;
applying the mechanical pressure to shape each of the plurality of composite charges to the respective forming and cure mandrel and a respective rigid base to form stringer layups, each stringer layup in the stringer layup comprising, respectively, the hat-shaped cross-section; and
applying vacuum pressure to the stringer layups and forming the plurality of compacted stringer packages.

14. The method of claim 11 further comprising:
removing the respective forming and cure mandrel from each of the plurality of compacted stringer packages.

15. The method of claim 1, further comprising:
the forming and cure mandrel comprising curvatures in a Y-Z plane and an X-Z plane;
the base comprising curvatures complimentary to a first portion of the curvatures in the Y-Z plane and the X-Z plane on the forming and cure mandrel;
shaping the composite charge to a second portion of the curvatures in the Y-Z plane and the X-Z plane in the forming and cure mandrel by applying the mechanical pressure to the composite charge; and
the compacted stringer package comprising the curvatures complimentary to the curvatures in the Y-Z plane and the X-Z plane on the forming and cure mandrel.

16. A method of forming a compacted stringer package, the method comprising:
placing a first radius filler, and a second radius filler alongside a forming and cure mandrel, configured for forming the compacted stringer package and supporting the compacting stringer package during curing, on a base of a mechanical shaping tool;
subsequently placing a composite charge over: the forming and cure mandrel, the first radius filler, and the second radius filler on the base;
after placing the composite charge over: the forming and cure mandrel, the first radius filler, and the second radius filler on the base, forming a stringer layup by conforming the composite charge to: the forming and cure mandrel, the first radius filler, the second radius filler, and the base, via using a shaping tool comprising a cap portion bracketed along opposing sides by respective pluralities of adjacent mechanical fingers comprising a semicircular shape and aligned along each length of the cap portion and ending in a tip directly applying mechanical pressure onto the composite charge against: the forming and cure mandrel, the first radius filler, and the second radius filler;
forming, by applying vacuum pressure to the stringer layup, the compacted stringer package comprising an uncured hat-shaped cross-section comprising curvatures in a Y-Z plane and a X-Z plane and a rigidity for transporting the compacted stringer package; and
removing the compacted stringer package from the base such that the compacted stringer package maintains a stiffness sufficient for transferring the compacted stringer package from a forming tool to a curing tool while maintaining the curvatures in the Y-Z plane and the X-Z plane on the uncured hat-shaped cross-section.

17. The method of claim 16 further comprising:
an inner ply connecting a first flange and a second flange of the uncured hat-shaped cross-section and contacting the first radius filler and the second radius filler.

18. The method of claim 16 further comprising:
wrapping a composite ply around the forming and cure mandrel.

19. The method of claim 16, wherein the forming and cure mandrel comprises at least one of: a collapsible mandrel, a dissolvable material, a solid mandrel, or an inflatable bladder.

20. The method of claim 16, further comprising the forming and cure mandrel serving as a curing bladder.

* * * * *